Figure 1:
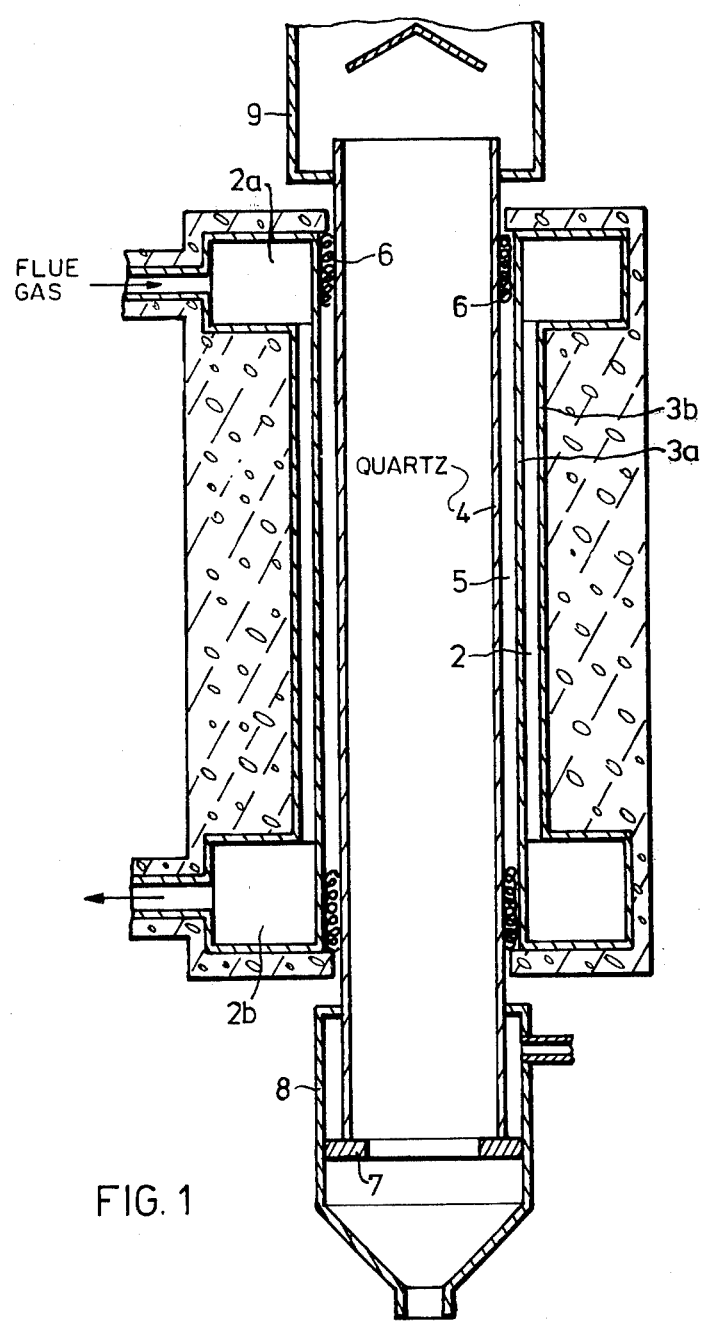

United States Patent [19]

Kühnlein et al.

[11] 4,164,441
[45] Aug. 14, 1979

[54] PROCESS AND APPARATUS FOR CONCENTRATING CORROSIVE LIQUID USING RADIANT HEAT

[75] Inventors: Hans L. Kühnlein, Fuellinsdorf, Switzerland; Wolfgang-Dieter Müller, Leverkusen, Fed. Rep. of Germany

[73] Assignees: Hch. Bertrams Aktiengesellschaft, Basel, Switzerland; Bayer Aktiengesellschaft, Leverkusen, Fed. Rep. of Germany

[21] Appl. No.: 802,103

[22] Filed: May 31, 1977

[30] Foreign Application Priority Data

Jun. 18, 1976 [CH] Switzerland .................... 007805/76

[51] Int. Cl.² .............................................. B01D 1/22
[52] U.S. Cl. .................... 159/13 A; 423/531; 159/24 A; 159/49
[58] Field of Search .............. 159/12 R, 12 A, 27 R, 159/23 B, 23 D, 24 R, 24 A, 28 R, 4 K, 4 VM, DIG. 18, DIG. 19; 202/233, 234; 203/25, 27; 423/531

[56] References Cited

U.S. PATENT DOCUMENTS

| | | | |
|---|---|---|---|
| 2,753,594 | 7/1956 | Buck | 159/13 C |
| 2,758,061 | 8/1956 | Geller | 159/49 |
| 3,004,901 | 10/1961 | Nerge et al. | 159/13 R |
| 3,500,893 | 3/1970 | McReynolds | 159/28 R |
| 3,933,575 | 1/1976 | Guth et al. | 159/13 A |

*Primary Examiner*—Norman Yudkoff
*Attorney, Agent, or Firm*—Sprung, Felfe, Horn, Lynch & Kramer

[57] ABSTRACT

A corrosive liquid such as sulphuric acid is concentrated using two spaced concentric tubes. A film of the acid flows down the inside of the inner tube and hot flue gases contact the outside of the outer tube. Advantageously, the inner tube transmits radiant energy, e.g. is made of quartz, so the outer tube heats the inner tube by radiation. This absence of mechanical stress on the inner tube increases its life. The water vapor is taken off at the top of the inner tube and concentrated solution at the bottom. If desired, the tubes could be reversed with the flue gases going through the inner tube and the outer tube being of quartz with the liquid flowing on its outside.

7 Claims, 6 Drawing Figures

PROCESS AND APPARATUS FOR CONCENTRATING CORROSIVE LIQUID USING RADIANT HEAT

The invention relates to a process and apparatus for the separation of corrosive liquid mixtures by evaporating at least one component; heat is supplied indirectly and an evaporating tube fed with a liquid film of the mixed substance is used, a coaxial heating jacket being applied to the column with radial clearance.

Processes and apparatuses of this kind are known, for example, in the chemical industry for the concentration of dilute sulfuric acid. An apparatus has thus been developed in which a thin liquid film of the mixture flows along the inner wall of a vertical column made of an inert heat-resistant material. The column is enclosed with radial clearance by a heating jacket. This heating jacket, which is heated up by a first liquid heat-carrying agent, e.g. a melt, passes its heat on to a second liquid heat-carrier, e.g. also a melt, which is inert towards the mixture and which is passed between the heating jacket and the evaporating tube and which in its turn heats the evaporating tube, effecting the evaporation. Thus the indirect supply of heat to the liquid film is achieved by the conduction of heat via liquid heat-carriers separated from the liquid film by coaxial tube walls. The use of such liquid heat supplying means, however, presents considerable problems in the construction and the operation of the apparatus.

One particular major difficulty is that the annular space containing the second liquid heat-supplying means and situated between the evaporating tube and the heating jacket has to be perfectly sealed off axially; the same applies of course to the whole path of the first liquid heat-supplying agent, which is to be heated on one side by, for example, heat exchange. The cost of construction and maintenance of such an apparatus is therefore disproportionately high. Quartz has proven to be particularly suitable for the evaporating tube. There is, however, particular risk of breakage of such quartz tubes, i.e. both the fitting of sealing means to this tube preventing the outflow of the liquid heat-supplying agent and the pressure exerted from one side by this heat-supplying agent easily lead to breakage of the evaporating tube. Especially in the preparation of highly concentrated sulfuric acid solutions, i.e. concentrating solutions containing 30% to 70% $H_2SO_4$ to form solutions containing at least 96% or up to the azeotropic level of over 98% $H_2SO_4$, evaporators are known which permit the forming, for example under vacuum, of concentrations of up to 85% in materials such as glass, enamel or tantalum, which are still resistant to concentrations of up to 85% and to temperatures of 160° C. These materials are no longer suitable for the preparation of concentrations of more than 85%.

Although quartz has proven to be a corrosion-resistant and temperature-sensitive material in the presence of boiling sulfuric acid in concentrations ranging between 85% and 98% under atmospheric pressure, the problem with using quartz is that the quartz surfaces are roughened by the action of boiling sulfuric acid, with the result that the mechanical stability is diminished. Numerous proposals using quartz parts sealed off against liquids by means of flange sealings, stuffing boxes and similar means have proven to be unsuitable because of the strain that these sealing devices cause on the quartz material.

The purpose of the present invention is to enable quartz to be used in such a way as to produce a reliably operating evaporating apparatus for preparing higher concentrations within the range of high concentration levels.

For this purpose the present invention proposes a process and an apparatus of the type mentioned hereinabove, which allow a drastic reduction in constructional and operational costs and also effect the best possible utilization of the heat supplied.

To fulfil this task the process according to the invention is characterized in that heat is transferred by means of radiation from one side of the heated heating jacket to the evaporating tube.

Above all, in this way the heat-transferring means, so far mainly in the form of a melt, responsible for conducting heat from the heating jacket to the evaporating tube, becomes superfluous. This method also cancels the need for complicated sealing means and the one-sided pressures exerted on the evaporating tube by this heat-transferring means.

Apart from this, greater reliability is achieved by the separation of the evaporating tube from the heating means by the gas space and the inspection possible replacement of the evaporating tube are simplified. Heating by means of radiation has the further advantage of greater flexibility. There is no need for a heat-transferring liquid so that a quicker heating up to the liquid film is possible. It is also possible to set a certain temperature gradient along the length of the evaporating tube.

The apparatus for conducting this process, also forming part of the subject of the invention, is characterized in that the heating jacket is separated from the evaporating tube by an axial gas space sealed off at least at its upper end. In accordance with the purpose of the invention this gas space is filled with air; sealing off towards the exterior is easily accomplished; it serves solely to prevent losses of heat from the gas space due to a chimney effect, losses through leakage hardly occurring at all, not as is the case when using a heat-conducting liquid. It has proven to be particularly advantageous to produce the evaporating tube from material which is at least partly able to be permeated by heat radiation, particularly from quartz, and to heat the heating jacket, consisting for example of heat-resistant steel, with hot gas, for example flue gas.

Figure 2:
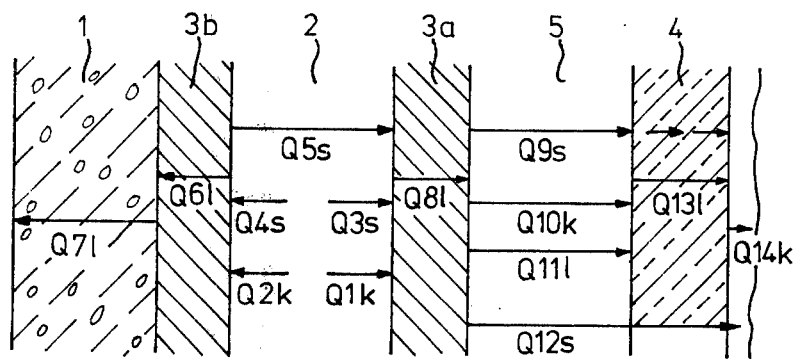
Figure 3:
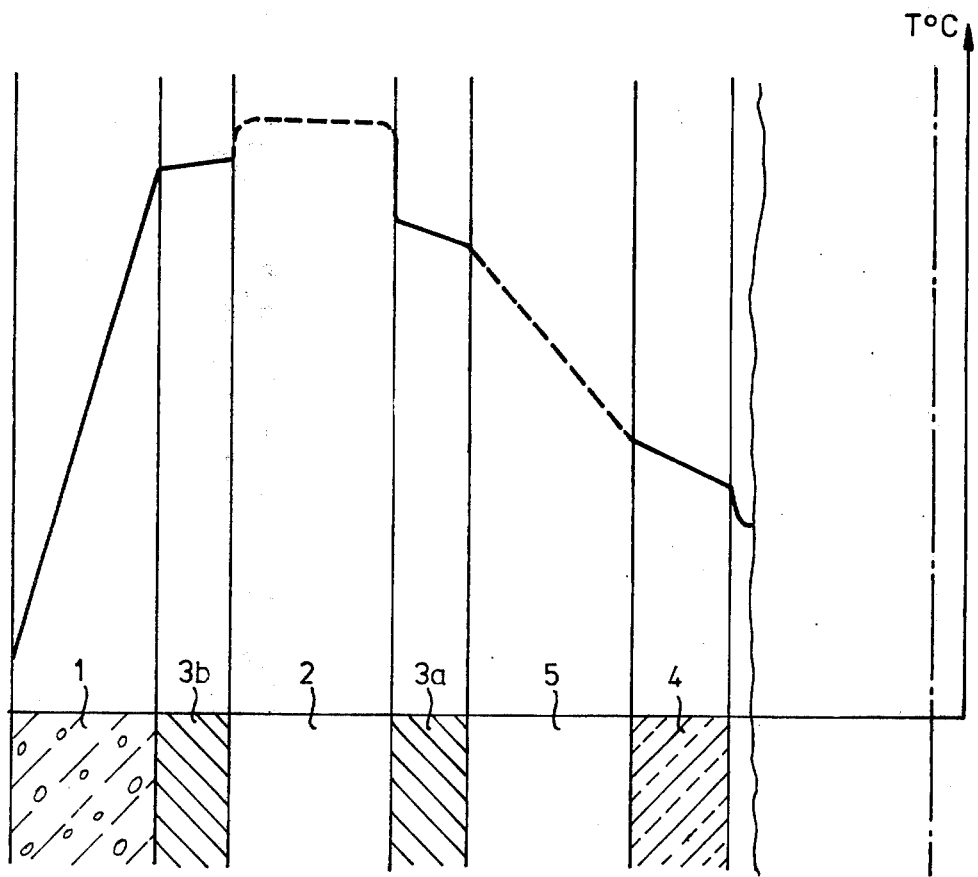
Figure 4:
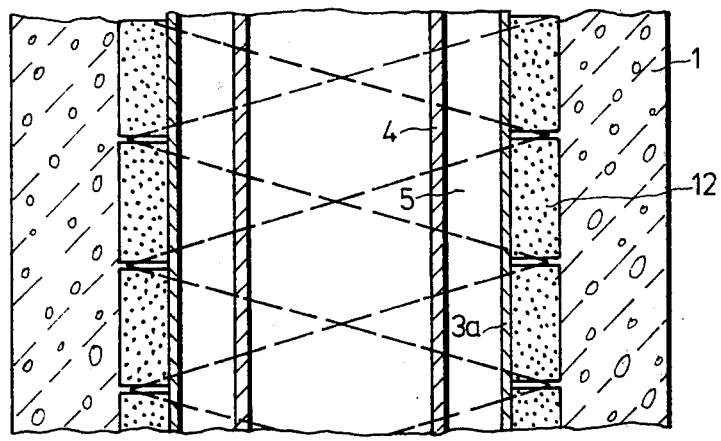
Figure 5:
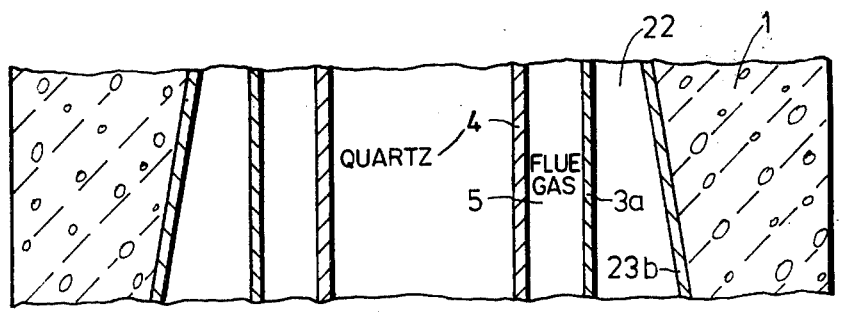
Figure 6:
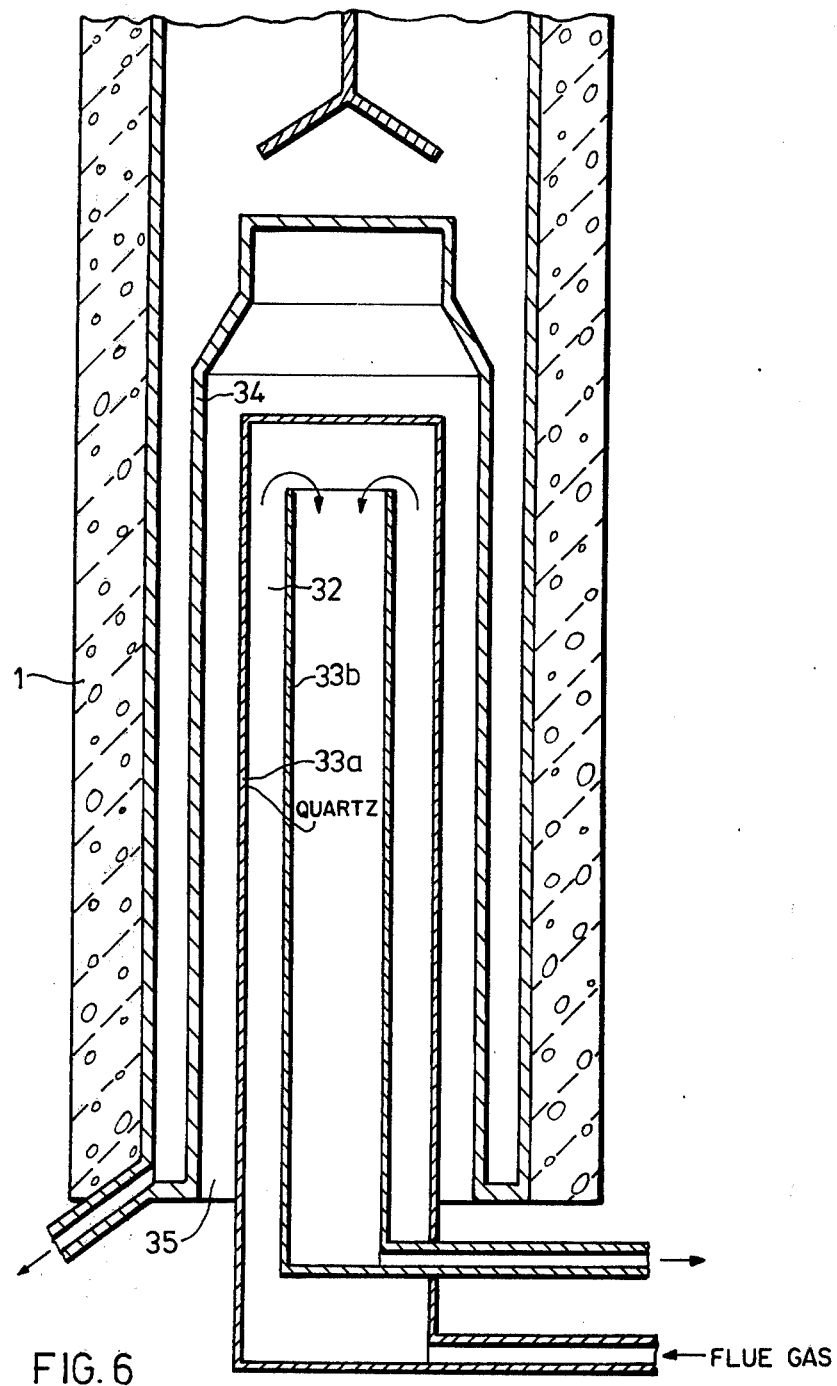

The invention will be further described with reference to the accompanying drawings, wherein:

FIG. 1 shows a diagrammatical axial section of a first embodiment of an apparatus according to the invention, FIG. 2 shows the heat flow ratios in the apparatus of FIG. 1, FIG. 3 shows the temperature curve in the apparatus of FIG. 1, FIGS. 4 & 5 each show axial sections of alternative apparatuses and FIG. 6 shows an axial section of a further embodiment of an apparatus according to the invention.

Referring now more particularly to the drawings, in FIG. 1, 1 is an insulating wall, held for example by an external steel tube (not shown), 2 is a cylindrical flue gas space with a widened distribution area 2c and collection area 2d adjacent to a radial inlet pipe 2a or outlet pipe 2b, and 3a and 3b form the coaxial cavity surrounding the flue gas space 2, with an inner heating, i.e. radiation, jacket 3a made of tinderproof steel through which an evaporating tube 4 passes with radial clearance, this tube being made of a material which is inert towards the corrosive liquid mixture to be separated, in this case for example $H_2SO_4$, and which is partly able to be permeated by heat rays, suitably a borosilicate or quartz. The annular space 5 in the area of the flue gas space 2, from 2c to 2d and between the evaporating tube 4 and the heating jacket 3a is filled with air and sealed off axially towards the exterior by a sealing means 6, although the sealing means 6 at the base may be omitted. The sealing means 6, which consists of a light, heat-resistant stopping material, e.g. quartz wool, prevents exchange of air or a chimney draught effect in the annular space 5. Instead of air another gas could also be provided in the annular space 5, which gas, besides being permeable to heat rays, is able to conduct heat and have a convective effect, thus assisting the heat transfer from the radiation wall 3a to the evaporating tube 4; such gases are for example hydrogen, helium, neon and water vapor. The evaporating tube 4 is held loosely at its upper end, that is it is not rigidly fixed, whereas at its base it is held in place by a support 7, made of an elastic material, inside a lower collecting container 8. Thus, apart from its own weight (slight compressive stress) there are no external forces working on the evaporating tube 4. However, it would also be possible to suspend the evaporating tube 4 from the upper part 9 of the evaporator and let it hang freely downwards into the collecting container 8.

In the operation of the described arrangement serving to concentrate sulfuric acid, the acid, preconcentrated for example to 85% and preheated to just below its boiling point, is supplied to the inner wall of the evaporating tube 4, flowing towards the base of the tube 4 in the form of a raltively thick film. On the other side a hot flue gas stream, directed from top to bottom, that is flowing parallel to the film of acid, is applied to the ring-shaped space 2; the vapors forming in the evaporating tube 4 leave it in an upward direction, whereas the concentrated acid passes downwards into the collecting container 8.

FIG. 2 shows the flow of heat energy as presented according to the example shown in FIG. 1.

The symbols in FIG. 2 have the following meanings:

$Q1^k$ convection of hot gas towards radiation jacket 3a, $Q2^k$ convection of hot gas towards the jacket tube 3b, $Q3^s$ radiation of hot gas towards the radiation jacket 3a, $Q4^s$ radiation of hot gas towards jacket tube 3b, $Q5^s$ radiation of outer jacket 3b towards radiation jacket 3a, $Q6^l$ conduction in outer jacket 3b from inside to outside, $Q7^l$ conduction in the heat insulation 1 from inside to outside, $Q8^l$ conduction in radiation jacket 3a from outside to inside, $Q9^s$ radiation from radiation jacket 3a to the evaporating tube 4, $Q10^k$ convection of the radiation jacket 3a to the evaporating tube 4, $Q11^l$ conduction from radiation jacket 3a to the evaporating tube 4, $Q12^s$ radiation from radiation jacket 3a directly to a radiation-absorbing liquid film next to the transparent evaporating tube 4, $Q13^l$ conduction in the evaporating tube 4 towards the inside, and $Q14^k$ convection from evaporating tube 4 to the liquid film 18.

The total amount of heat transferred to the film is the sum of $Q12^s + Q14^k$, which is equal to $Q8^l$.

Under steady operation the losses amount to $Q6^l = Q7^l$, assuming that losses in an axial direction are disregarded. The individual heat flow density values Q are dependent on the geometrical measurements involved, the amounts and compositions of the substances being supplied the construction materials used as well as contaminating factors such as sooting in the hot-gas space which have to be taken into consideration in practice. The main characteristic in all cases is, however, that the energy is predominantly passed to the liquid film by means of radiation from radiation jacket 3a; and this is achieved without any mechanical effect on the evaporating tube 4.

Practical experiments have shown that a particularly favorable heating of the evaporating tube is achieved if the ratio of the diameter of the evaporating tube surface surrounding the gas space to the diameter of the radiant surface of the heating jacket is approximately between 1:1.5 and 1:3 and preferably about 1:2, for example.

The corresponding temperature curve of the apparatus is shown in FIG. 3. With flue gas temperatures of about 950° C. 85% strength acid feed can be concentrated to approximately 92%. The evaporating arrangement, operating under atmospheric pressure and with radiation heat, allows not only a particularly good degree of utilization of the heat applied, but is also, as far as construction and operation are concerned, simple and only to a very small degree susceptible to interruption.

In the preceding description a hot gas stream is provided for the heating of the radiation jacket. It goes without saying that another heating medium or an electric heating device could also be provided for this purpose. The last-mentioned variant is shown by way of example in FIG. 4; here a tape-shaped electric spiral 12 is provided in the intermediate space between the insulating wall 1 and the radiation jacket 3a, preferred, however, is the heating with a hot gas stream.

In the example according to FIG. 1 the flue gas channel 2 is separated on the outside from the insulating wall 1 by a steel jacket. If there is sufficient smooth and non-abrasive insulating material 1 present the outer jacket 3b can be omitted. Instead of being cylindrical the flue gas channel could also be tapered in an upward direction if, for example, as with 23b in FIG. 5, the outer jacket or the insulation wall is conical in shape, or if the diameter of the outer jacket or the insulating wall gradually becomes smaller in an upward direction.

In the preceding description it is always assumed that the radiation jacket is heated from the outside and that the evaporation tube is coaxially arranged inside the radiation jacket, the film of liquid mixture being provided on the inner side of the evaporating tube. Another type of construction is however also possible, in which, as shown by way of example in FIG. 6, the hot gas channel 32 consists of two inner, coaxial steel tubes 33a, 33b; at the same time the outer tube 33a forming the radiation jacket is sealed at both upper and lower ends, whereas the inner tube 33b is open at its upper end. The radiation jacket 33b is enclosed by an evaporating tube 34 which is closed at its upper end, an air-filled annular space forming a clearance between the radiation jacket 33b and the evaporating tube 34; the latter is in its turn surrounded, with radial clearance, by the lining 34a of the insulating wall 1, this lining being corrosion-resistant and inert towards the mixture to be separated. This lining consists, for the purpose of the invention, of the same material as the evaporating tube 34, that is, for example, of quartz. During the operation of this arrangement the film of liquid mixture is provided on the outside of the evaporating tube 34, while the flue gases stream in from below through the flue gas channel 35 in the opposite direction to this film and leave the apparatus in a downward direction via the central tube 33b. In this case as well the radiation jacket 33a, heated by the hot flue gases, gives off heat, by means of radiation, to the evaporating tube 34, that is to the film of mixed substance flowing down its outer side. It is not necessary to seal the lower end of the air-filled radiation space which is closed at the top; this space can, however, specially if another gas is used instead of air, be sealed off at its lower end as well. In this case as well, the evaporating tube 34 is either suspended from above hanging downwards freely or it is only held below on an elastic support, so that its own weight is the only mechanical pressure on this tube.

EXAMPLE

An apparatus was provided as shown in FIG. 1, tube 4 being made of 0.3 cm quartz with an internal diameter of 12 cm. Spaced therefrom by 2 cm jacket 3a was a 2 meter long cast iron vessel supplied with 3460 Nm$_3$/hour of flue gases at 990° C. The gas was withdrawn at 650° C. Sulfuric acid of 85% of weight concentration was flowed down the inside of tube 4 and sulfuric acid of 98.3% concentration was recovered at the bottom of tube 4. The apparatus performed trouble-free for several days when the trial was terminated.

It will be appreciated that the instant specification and examples are set forth by way of illustration and not limitation, and that various modifications and changes may be made without departing from the spirit and scope of the present invention.

What is claimed is:

1. A process for the separation of corrosive liquid mixtures by evaporating at least one component thereof, comprising establishing a downwardly flowing film of said liquid mixture on the first surface of a first member having first and second surfaces and which is permeable to radiation, supplying heat to the first surface of a second member having first and second surfaces and spaced from the second surface of said first member by a gas space, the heat being supplied to said first surface of said second member by direct contact with hot flue gases supplied to a space of which said second member constitutes one bounding element, the second surface of said second member transferring heat by radiation to the second surface of the first member, thereby evaporating at least one component of said liquid mixture, and withdrawing the evaporated material.

2. A process according to claim 1, wherein said mixture is a diluted sulphuric acid and water is evaporated, and including the further step of withdrawing concentrated sulphuric acid from said first member.

3. A process according to claim 2, wherein the rate of flow of the hot flue gases and the diluted sulphuric acid, and the spacing between said first and second members is such that the concentrated sulphuric acid leaving said first member is just below its boiling point.

4. An apparatus for effecting evaporation comprising a first tube of radiation permeable material open at its top to remove vapors from the inside of said tube, means supporting said first tube at only one of its ends while the other end is axially movable, a second tube surrounding the first tube and spaced therefrom and providing therebetween a gas space closed at its top, said second tube being the inside wall of an annular element, means for introducing hot flue gases into said annular element thereby to heat said second tube, said second tube supplying heat to said first tube primarily by radiation across said gas space, means for supplying liquid to the inside surface of said first tube for evaporation and means for withdrawing vapors evaporated from the inside surface of said first tube.

5. An apparatus according to claim 4, wherein said first tube is formed of quartz.

6. An apparatus according to claim 5, wherein the diameter of the second tube is about 1.5 to 3 times that of the first tube.

7. An apparatus according to claim 5, wherein the diameter of the second tube is about twice that of the first tube.

* * * * *